(12) United States Patent
Durbin et al.

(10) Patent No.: US 12,705,915 B2
(45) Date of Patent: Aug. 11, 2026

(54) QUANTITATIVE DISORDER ENHANCED AUGMENTATIVE/ALTERNATIVE COMMUNICATION DEVICE AND PROCESS

(71) Applicant: Board of Trustees of Western Michigan University, Kalamazoo, MI (US)

(72) Inventors: Steven Michael Durbin, Kaneohe, HI (US); Robert Allen Makin, III, Kalamazoo, MI (US)

( * ) Notice: Subject to any disclaimer, the term of this patent is extended or adjusted under 35 U.S.C. 154(b) by 356 days.

(21) Appl. No.: 18/378,917

(22) Filed: Oct. 11, 2023

(65) Prior Publication Data

US 2024/0127618 A1 Apr. 18, 2024

Related U.S. Application Data

(60) Provisional application No. 63/416,758, filed on Oct. 17, 2022.

(51) Int. Cl.
*G06V 30/19* (2022.01)
*G06F 3/16* (2006.01)
*G06T 11/23* (2026.01)

(52) U.S. Cl.
CPC ........ *G06V 30/19173* (2022.01); *G06F 3/167* (2013.01); *G06T 11/23* (2026.01)

(58) Field of Classification Search
CPC .. G06V 30/19173; G06V 10/82; G06F 3/167; G06T 11/203; G06T 11/23
USPC .................................................. 382/157, 224
See application file for complete search history.

(56) References Cited

U.S. PATENT DOCUMENTS 5,726,669 A * 3/1998 Obata .................... G06F 3/0481 715/733
6,744,915 B1 * 6/2004 Barton ................ G06F 16/5854 382/161
6,785,418 B1 * 8/2004 Barton ............... G06V 30/1423 345/181
8,479,122 B2 * 7/2013 Hotelling ............ G06F 3/04883 715/767
8,977,779 B2 3/2015 Pratt
10,262,555 B2 4/2019 Campbell
10,586,351 B1 3/2020 Brailovskiy et al.
(Continued)

FOREIGN PATENT DOCUMENTS

CA 2886429 C * 9/2022
CN 102695070 A * 9/2012
(Continued)

OTHER PUBLICATIONS

Xian Wu, Chen Wang, Hongbo Fu, Ariel Shamir, Song-Hai Zhang and Shi-Min Hu; "DeepPortraitDrawing: Generating Human Body Images from Freehand Sketches" (Year: 2022).*
(Continued)

*Primary Examiner* — Charlotte M Baker

(57) ABSTRACT

A method of interpreting human-drawn images includes modifying a human-drawn image. A numerical value corresponding to an order parameter squared ($S^2$) is extracted from the modified image. An artificial intelligence (AI) program characterizes the human-drawn image utilizing the human-drawn image and the numerical value of the order parameter. The disclosure further includes systems, computer readable media, programs capable of the same.

16 Claims, 6 Drawing Sheets

(56) References Cited

U.S. PATENT DOCUMENTS

| | | | | |
|---|---|---|---|---|
| 2009/0219383 | A1* | 9/2009 | Passmore | H04N 13/261 348/E13.001 |
| 2012/0141032 | A1 | 6/2012 | Ouyang et al. | |
| 2012/0301042 | A1* | 11/2012 | Komatsu | H04N 1/628 382/254 |
| 2014/0205188 | A1 | 7/2014 | Ouyang et al. | |
| 2017/0351420 | A1* | 12/2017 | Rigouste | G06F 3/0237 |
| 2018/0095653 | A1* | 4/2018 | Hasek | G06F 3/04883 |
| 2019/0050427 | A1* | 2/2019 | Wiesel | G06T 19/00 |
| 2020/0097709 | A1 | 3/2020 | Huang et al. | |
| 2020/0302163 | A1* | 9/2020 | Shi | G06N 3/0495 |
| 2021/0064858 | A1* | 3/2021 | Batra | G06V 30/333 |
| 2021/0349627 | A1* | 11/2021 | Chang | G06F 3/04842 |
| 2022/0020289 | A1 | 1/2022 | Sonnenschein | |
| 2022/0084504 | A1 | 3/2022 | Kwatra et al. | |
| 2022/0164097 | A1* | 5/2022 | Tadros | G06F 3/0412 |
| 2023/0109732 | A1* | 4/2023 | Hertzmann | G06N 3/0475 345/427 |

FOREIGN PATENT DOCUMENTS

| | | | | |
|---|---|---|---|---|
| CN | 103955689 | | 7/2014 | |
| CN | 109542575 | A * | 3/2019 | G06F 9/451 |
| CN | 110415327 | A * | 11/2019 | G06T 19/20 |
| JP | 3673474 | B2 * | 7/2005 | G03B 17/12 |
| JP | 2010282472 | A * | 12/2010 | |
| JP | 4856804 | B2 * | 1/2012 | |
| JP | 2016110518 | A * | 6/2016 | G06F 3/0485 |
| JP | 6473899 | B1 * | 2/2019 | G06K 19/06131 |
| KR | 20120095429 | A * | 8/2012 | G06T 1/00 |
| TW | 1780495 | B * | 10/2022 | G06F 1/3293 |
| WO | 2011047218 | | 4/2011 | |
| WO | 2019167052 | | 9/2019 | |
| WO | WO-2019171440 | A1 * | 9/2019 | G06V 10/774 |

OTHER PUBLICATIONS

David Ha and Douglas Eck; "A Neural Representation of Sketch Drawings" (Year: 2017).*

S. Kuwabara, R. Ohbuchi and T. Furuya; "Query by Partially-Drawn Sketches for 3D Shape Retrieval," 2019 International Conference on Cyberworlds (CW), Kyoto, Japan, 2019, pp. 69-76. doi: 10.1109/CW.2019.00020 (Year: 2019).*

Chen Yang, Dana Sharon and Michiel can de Panne; "Sketch-based Modeling of Parameterized Objects", 2nd Eurographics Workshop on Sketch-Based Inerfaces and Modeling (2005), pp. 1-10 (Year: 2005).*

Zhengyan Tong, Zuanhong Chen, Bingbing Ni and Xiaohang Wong; Sketch Generation with Drawing Process Guided by Vector Flow and Grayscale, The Thirty-Fifth AAAI Conference on Artificial Intelligence (AAAI-21) (Year: 2020).*

Karan Ahuja, Paul streli and Christian Holz; "TouchPose: Hand Pose Prediction, Depth Estimation, and Touch Classification from Capacitive Images" (Year: 2021).*

CN 103955689 (English Translation).

ISR from PCT/US2023/034922 (Apr. 16, 2024).

* cited by examiner

QUANTITATIVE DISORDER ENHANCED AUGMENTATIVE/ALTERNATIVE COMMUNICATION DEVICE AND PROCESS

CROSS REFERENCE TO RELATED APPLICATIONS

The present application claims the benefit under 35 USC § 119(e) to U.S. Provisional Patent Application No. 63/416,758, filed Oct. 17, 2022; the entire disclosure of that application is incorporated herein by reference.

STATEMENT REGARDING FEDERALLY SPONSORED RESEARCH OR DEVELOPMENT

This invention was made with government support under 2003581, 1410915, and 1935382 awarded by the National Scient Foundation. The government has certain rights in the invention.

TECHNICAL FIELD

The present disclosure relates to computer-aided systems and methods that may be utilized to aid interpretation of human-drawn images such as writing, drawings, signatures and the like by software and stand-alone devices.

BACKGROUND OF THE INVENTION

Improved computer-based recognition of user-drawn inputs, such as words or images, where the user may input the image via touch screen or stylus, have recently used AI training methods to properly recognize the identity of the input for further processing. Example applications include speech to text, image-to-text, and have further potential to aid disabled individuals to communicate with computers and others. AI training has limitations due to accuracy, processing time and training time. Other applications may include signature recognition, for example.

The present disclosure describes methods of aiding AI training by computing an order parameter of the user-drawn input, where the degree of disorder can be used independently or fed into an AI model to improve accuracy and reduce computing time.

BRIEF SUMMARY OF THE INVENTION

An aspect of the present disclosure is a computer-implemented method of interpreting human-drawn images. The method includes utilizing a computer to form a Fourier spectrum by taking a Fourier transform of a human-drawn image that may be in the form of digital image data. The method further includes utilizing a computer to form an MTF-modified Fourier transform by applying an idealized modulation transfer function (MTF) to the Fourier spectrum, wherein the MTF may be constant across all frequencies. A computer is utilized to form a modified image by taking an inverse Fourier transform of the MTF-modified Fourier transform. The method further includes utilizing a computer to extract a numerical value corresponding to an order parameter squared ($S^2$) from the modified image. The modified image includes light regions and dark regions, and $S^2$ comprises a numerical value quantifying a degree of order present in the modified image. The extracted numerical value comprises a ratio of an area of the light regions to a total area. The total area is equal to the sum of: 1) an area of the light regions, and 2) an area of the dark regions. The method further includes causing an artificial intelligence (AI) program to characterize the human-drawn image utilizing 1) the human-drawn image, and 2) the numerical value of the order parameter extracted from the modified image formed from the human-drawn image. The computer outputs at least one of an image and speech that identifies the human-drawn image.

Embodiments of the present disclosure include a computer program and/or computer readable storage medium, comprising instructions to carry out the method comprising forming a modified image from a human-drawn image by replicating a physical image formation process; extracting a numerical value corresponding to an order parameter squared (S2) from the modified image, wherein the modified image includes light regions and dark regions, and wherein S2 comprises a numerical value quantifying a degree of order present in the modified image, and wherein the extracted numerical value comprises a ratio of an area of the light regions to a total area that is equal to the sum of: 1) an area of the light regions, and 2) of an area of the dark regions; using an artificial intelligence (AI) program to characterize the human-drawn image utilizing: 1) the human-drawn image, and 2) the numerical value of the order parameter extracted from the modified image formed from the human-drawn image; and outputting at least one of an image and text that identifies the human-drawn image. Further embodiments include training the AI program by causing the AI program to characterize human-drawn images for a plurality of non-identical human-drawn images using 1) the human-drawn image, and 2) the numerical value of the order parameter extracted from the modified image formed from the human-drawn image.

In further embodiments, the plurality of non-identical sets of human-drawn images are formed by a human utilizing an input device that allows a user to manually form the human-drawn image data. In yet further embodiments, the human-drawn image data includes at least one image drawn by a human using the touch screen. In yet further embodiments, the human-drawn image data includes at least one image drawn by a human using a touch screen; in some embodiments, the human-drawn image comprises a symbolic drawing of an object and/or text. In some embodiments, the AI program characterizes the symbolic drawing by outputting a word describing the object and/or text. In yet other embodiments, causing the AI program to characterize the human-drawn image includes supplying the AI with 1) the human-drawn image, and 2) the numerical value of the order parameter extracted from the modified image formed from the human-drawn image. In yet other embodiments, forming a modified image includes: utilizing a computer to form a Fourier spectrum by taking a Fourier transform of a human-drawn image that is in the form of digital image data; utilizing a computer to form an MTF-modified Fourier transform by applying an idealized modulation transfer function (MTF) to the Fourier spectrum, wherein the MTF is constant across all frequencies; utilizing a computer to form a modified image by taking an inverse Fourier transform of the MTF-modified Fourier transform.

Further embodiments of the present invention include a data processing system capable of performing the above methods. In some embodiments, the system comprises a draw-to-speech device. In others, human-drawn images represent at least one of numbers, letters, words, pictures, or concepts; and the draw-to-speech device is capable of generating an audio signal comprising a word corresponding to the numbers, letters, words, pictures, or concepts of the human-drawn image. In other embodiments, the system comprises a portable device having a touch screen; the human-drawn image data includes at least one image drawn by a human using the touch screen. In some embodiments, the portable device is selected from the group consisting of smart phones and tablet computers These and other features, advantages, and objects of the present invention will be further understood and appreciated by those skilled in the art by reference to the following specification, claims, and appended drawings.

DETAILED DESCRIPTION

Figure 1:
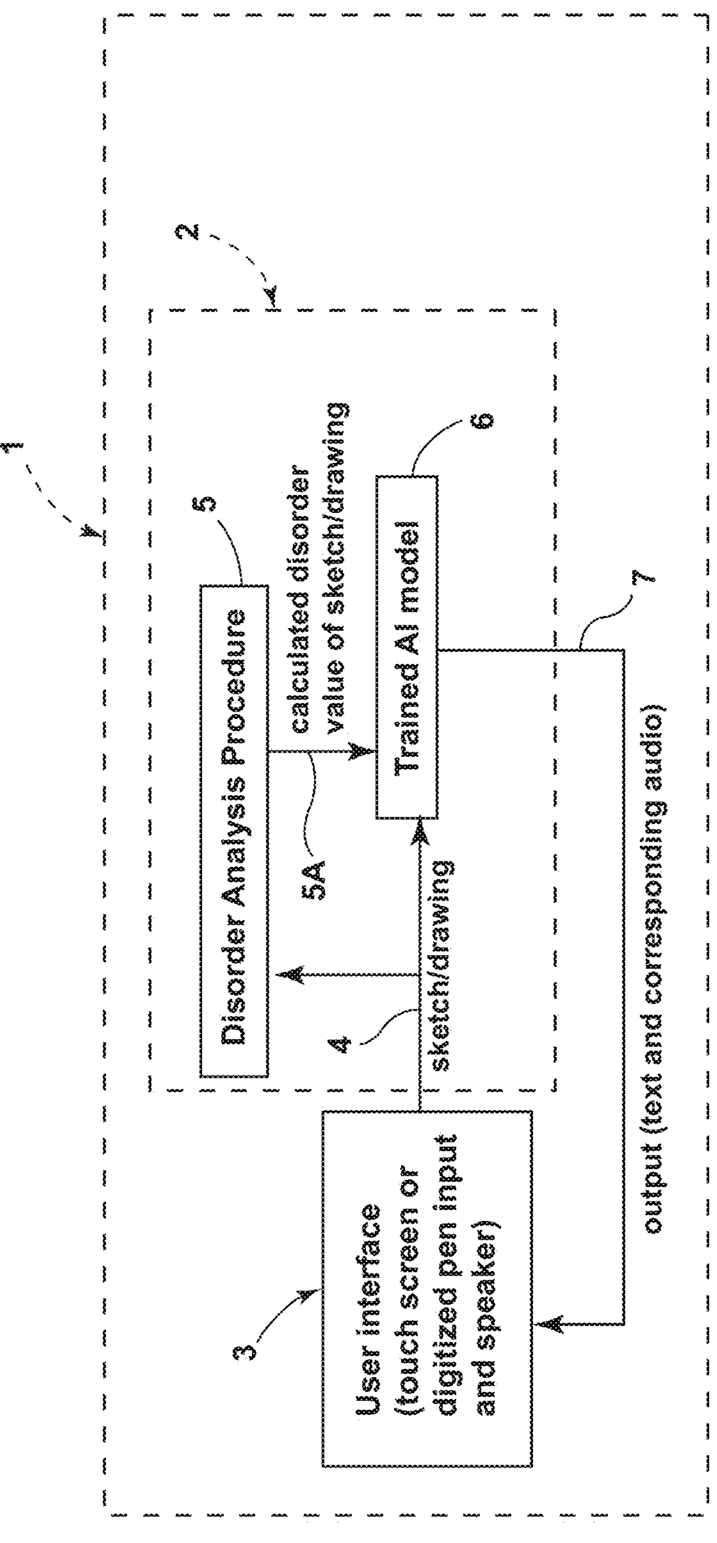
FIG. 1 is a schematic diagram showing a device that is configured to implement an aspect of the present disclosure.

For purposes of description herein the terms "upper," "lower," "right," "left," "rear," "front," "vertical," "horizontal," and derivatives thereof shall relate to the disclosure as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply example embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a device 1 may comprise a processor 2 and a user interface 3. Device 1 may comprise a smartphone, tablet, smartwatch, computer or other suitable device, and the user interface 3 may comprise a touch screen, digitized pen input and speaker, or other suitable inputs. As discussed in more detail below, a user may utilize the interface 3 to input one or more letters, words, or drawings (e.g., FIGS. 2-4), and the sketch or drawing 4 may be utilized as an input in a disorder analysis procedure 5, and as an input into an AI model 6; the calculated disorder value 5A from procedure 5 of the sketch/drawing 4 may be fed into the AI model in some embodiments. The AI model 6 may be trained to recognize and identify human sketches or drawings. The disorder analysis procedure 5 and trained AI model 6 may be implemented utilizing processor 2 of device 1, or other suitable computing device. An output 7 from the trained AI model is provided to user interface 3. Output 7 may comprise a "label" (e.g., a word) identifying the human-drawn image. Output 7 may be in the form of text, audio, and/or an image. User interface 3 may comprise a speaker to provide audio output to a user.

Figures 2, 3:
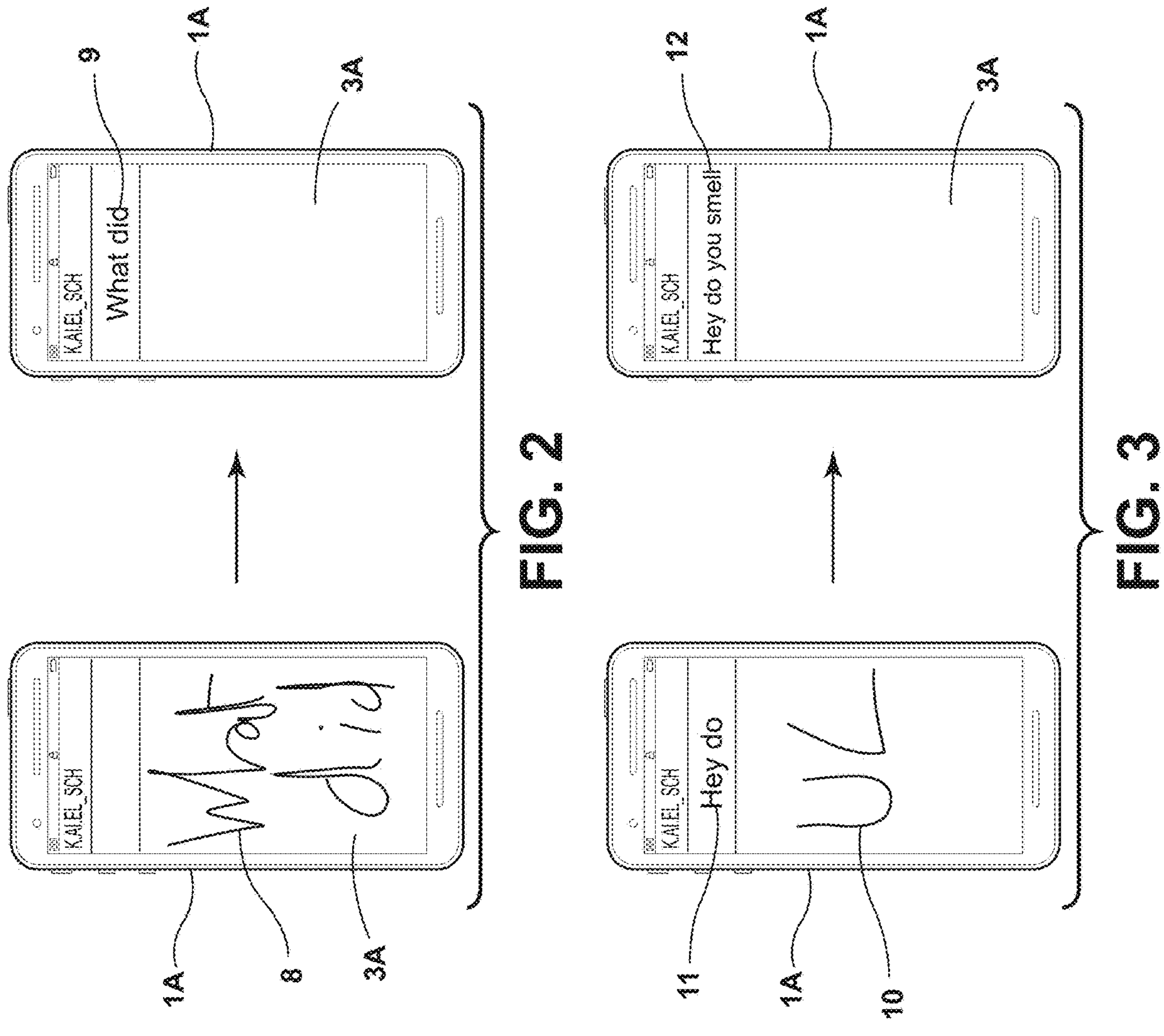
FIG. 2 is a fragmentary front elevational view showing a machine learning-based "drawn-to-speech" device implemented on a device such as a smart phone or tablet.
FIG. 3 is a fragmentary front elevational view showing a machine learning-based "drawn-to-speech" device implemented on a device such as a smart phone or tablet.

With reference to FIG. 2, a device 1A may include a touchscreen 3A that receives human-written words 8 that are characterized by the device 1A whereby the device 1A outputs text 9 corresponding to the human-drawn words 8. Referring to FIG. 3, similarly a combination of human-drawn letters 10 and human-entered text 11 may be input into device 1A via touch screen 3A, and device 1A may output text 12.

Figures 4, 5, 6:
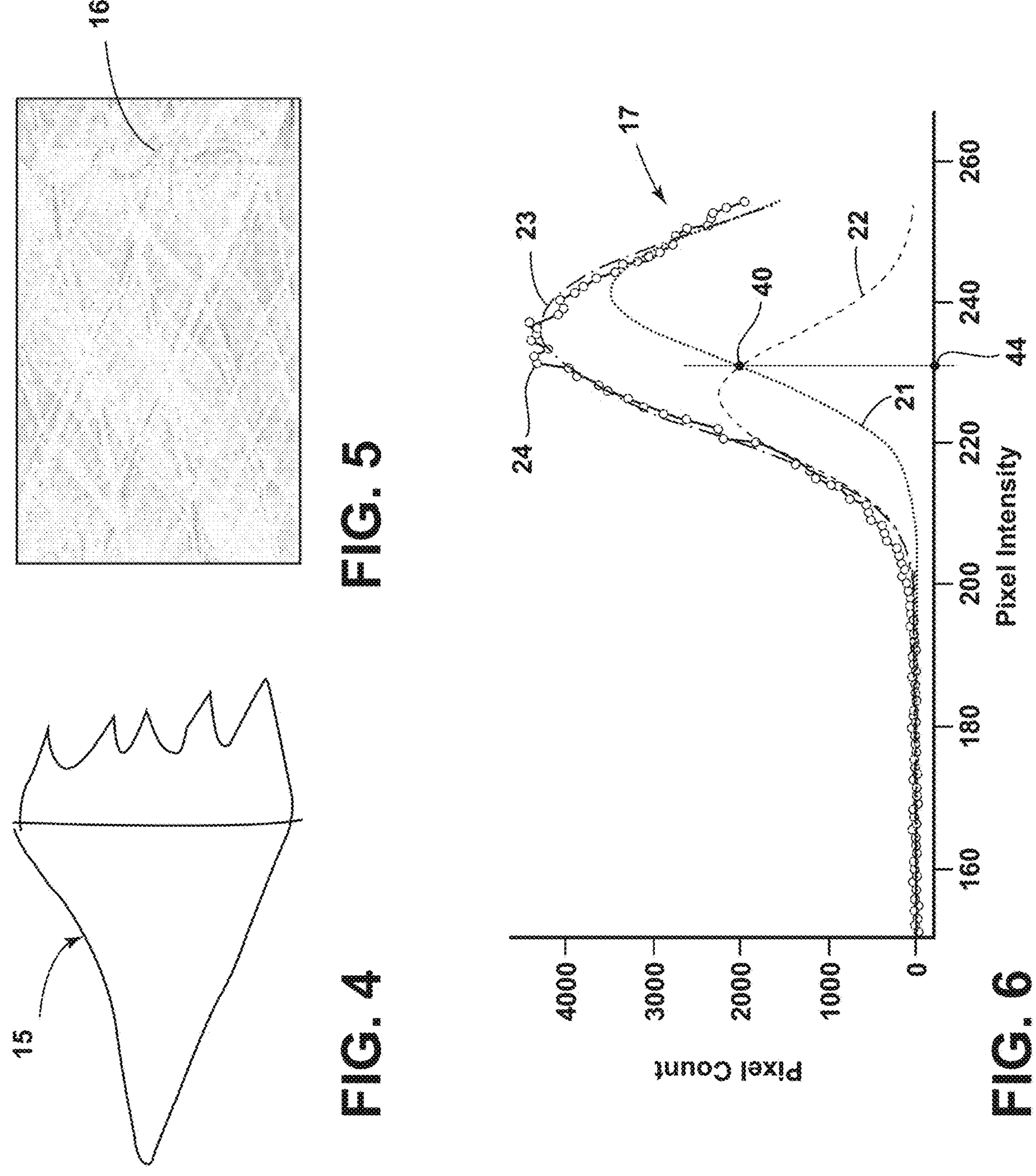
FIG. 4 is a human-drawn image or drawing.
FIG. 5 is an image comprising an inverse Fourier transform of a magnitude of the Fourier transform of the image of FIG. 4.
FIG. 6 is a graph showing a disorder analysis of a pixel intensity histogram corresponding to the images of FIGS. 4 and 5.

With further reference to FIGS. 4-6, a human-drawn image or symbol 15 may be utilized as an input in a process according to an aspect of the present disclosure. A process corresponding to FIGS. 4-6 is described in more detail below in connection with FIGS. 10 and 11. In the example of FIG. 4, the human-drawn image 15 is a symbolic representation of a carrot. The digital image 15 (FIG. 4) may be modified utilizing a Fourier transform, modulation transfer function (MTF) and inverse Fourier transform to form a modified image 16 (FIG. 5).

A graph 17 (FIG. 6) shows a disorder analysis according to an aspect of the present disclosure. The disorder analysis 5 results in an order parameter that varies between 1 (ordered) and 0 (completely disordered). The procedure involves the concept of constructive and destructive interference. Waves interacting with ordered features or regions of a system (i.e., object, image, etc) produce constructive interference patterns that lead to bright or high intensities, while waves interacting with disordered features or regions of a system produce destructive interference that leads to dim or lower intensities. The procedure described herein analyzes the distribution of intensities 24 within an image and calculates the degree of disorder from these intensities by fitting two Gaussian curves 21, 22 (one curve the intensities due to disorder, and the other curve is the intensities due to ordered portions of an object), as well as an overall fit 23, in some embodiments and aspects. For an experimental measurement (e.g., of a material), these intensities are produced by photons or electrons interacting with the object being observed. The intersection 40 of the curves 21 and 22 may then be determined, and a threshold value 44 may then be determined, as discussed in more detail below in connection with FIGS. 10 and 11. For a human-created drawing, the intensity distribution that would be obtained from an image of the object taken by an imaging system, such as a microscope, can be obtained from a synthetically generated image created using Fourier optics and a modulation transfer function (MTF).

Figures 7, 8, 9:
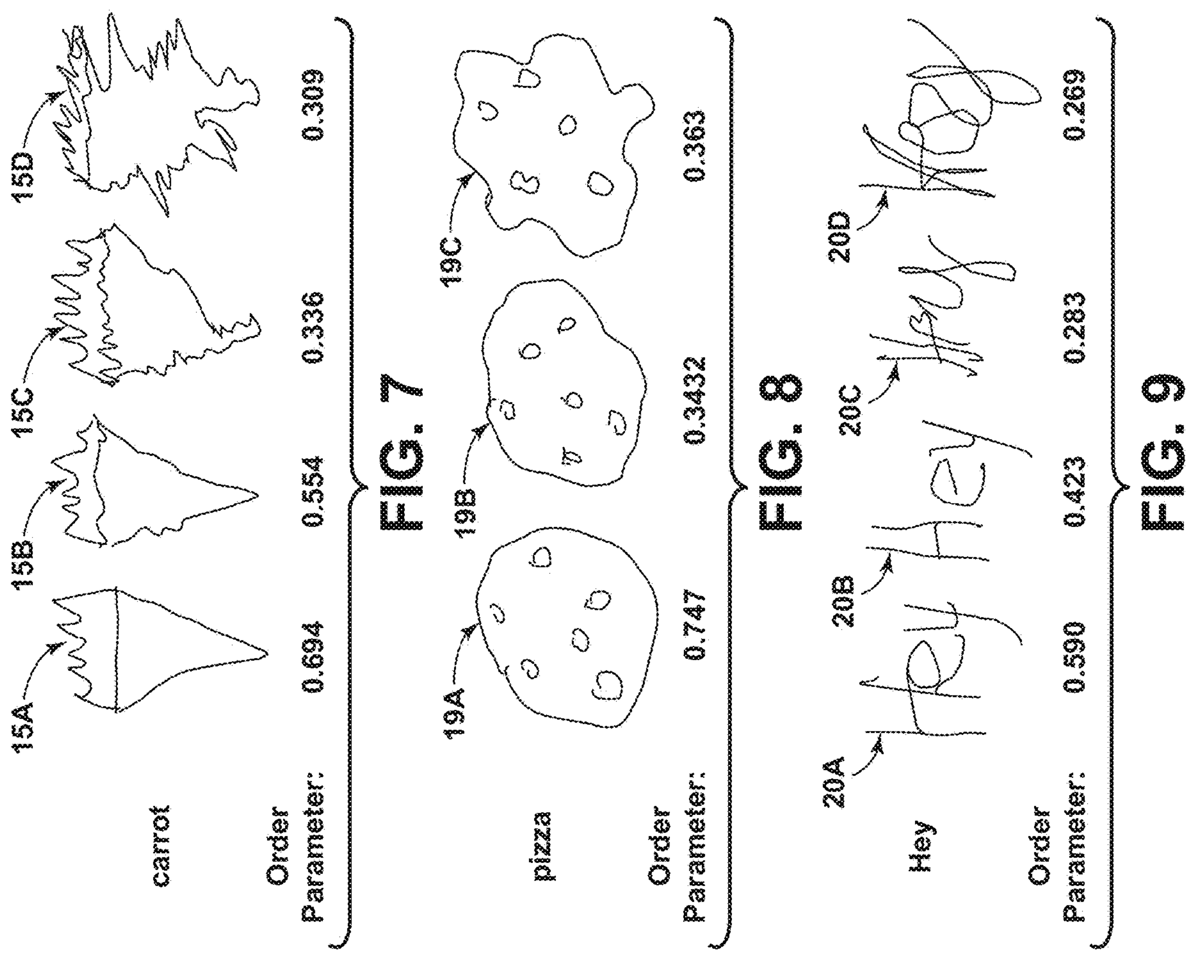
FIG. 7 is a human-drawn carrot symbol and modified versions thereof, and corresponding order parameters.
FIG. 8 is a human-drawn pizza symbol and modified versions thereof, and corresponding order parameters.
FIG. 9 is a human-drawn word "Hey" symbol and modified versions thereof, and corresponding order parameters.

Examples of inputs (sketches) and the corresponding order parameters are shown in FIGS. 7-9. In general, images of carrots 15A-15D (FIG. 7) having increasingly uneven (e.g., less-straight) lines have corresponding order parameters that decrease. The same general pattern can be seen for sketches 19A-19C of pizzas (FIG. 8), and for the images 20A-20D of the word "Hey" (FIG. 9). Utilizing the order parameter as an input into a trained AI model 6 (FIG. 1) along with a disorder parameter (numerical value) may result in improved recognition (characterization) of images by a trained AI model.

For example, in FIG. 7, a conventionally trained AI initially characterized (recognized) the carrot 15B with an order parameter of 0.554 as a carrot and characterized the carrot image 15C with order parameter 0.336 as a snowman (As used herein, "characterize" generally refers to the output of an AI program, and "recognize" generally refers to a characterization that is accurate and correct). However, training the AI model with the same images 15A-15D, in tandem with the order parameter of each image 15A-15D, the AI model was able to correctly identify (recognize) the carrot image 15C (order parameter 0.336). Thus, utilizing a numerical order parameter input along with a human-drawn image to augment the AI component of software may significantly improve the ability of the software (AI model) to distinguish between similar symbols an individual (human) might define and easily recognize, but could otherwise have them mapped to the same outcome by the AI model.

Thus, a disorder analysis according to an aspect of the present disclosure can be utilized to ensure that a symbol or other image is recognized even if there are slight or considerable morphological changes from one drawing or sketch of the symbol to the next, which could occur in everyday drawing.

Figure 10:
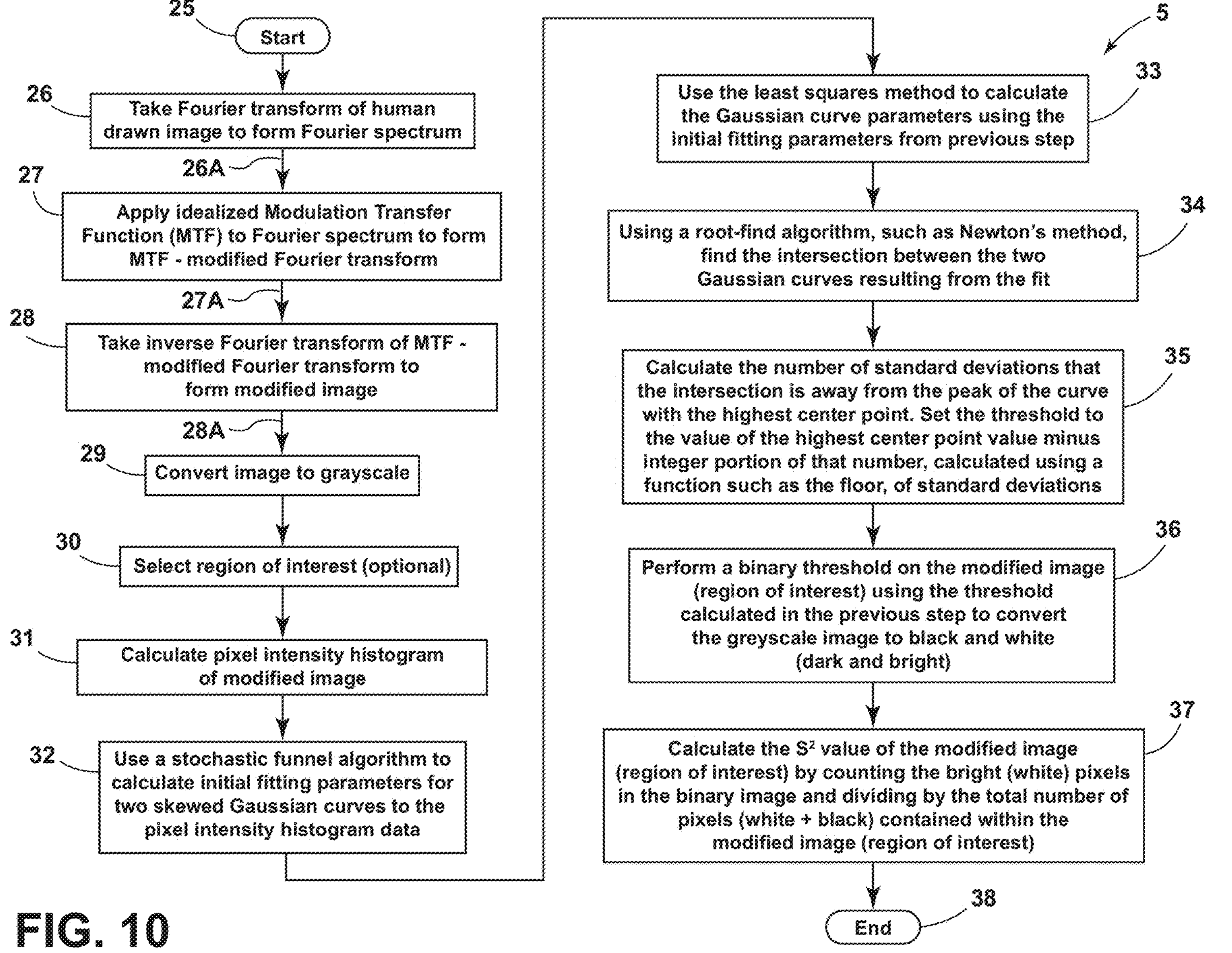
FIG. 10 is a flow chart showing a process for determining an order parameter of a human-drawn image.
Figure 11:
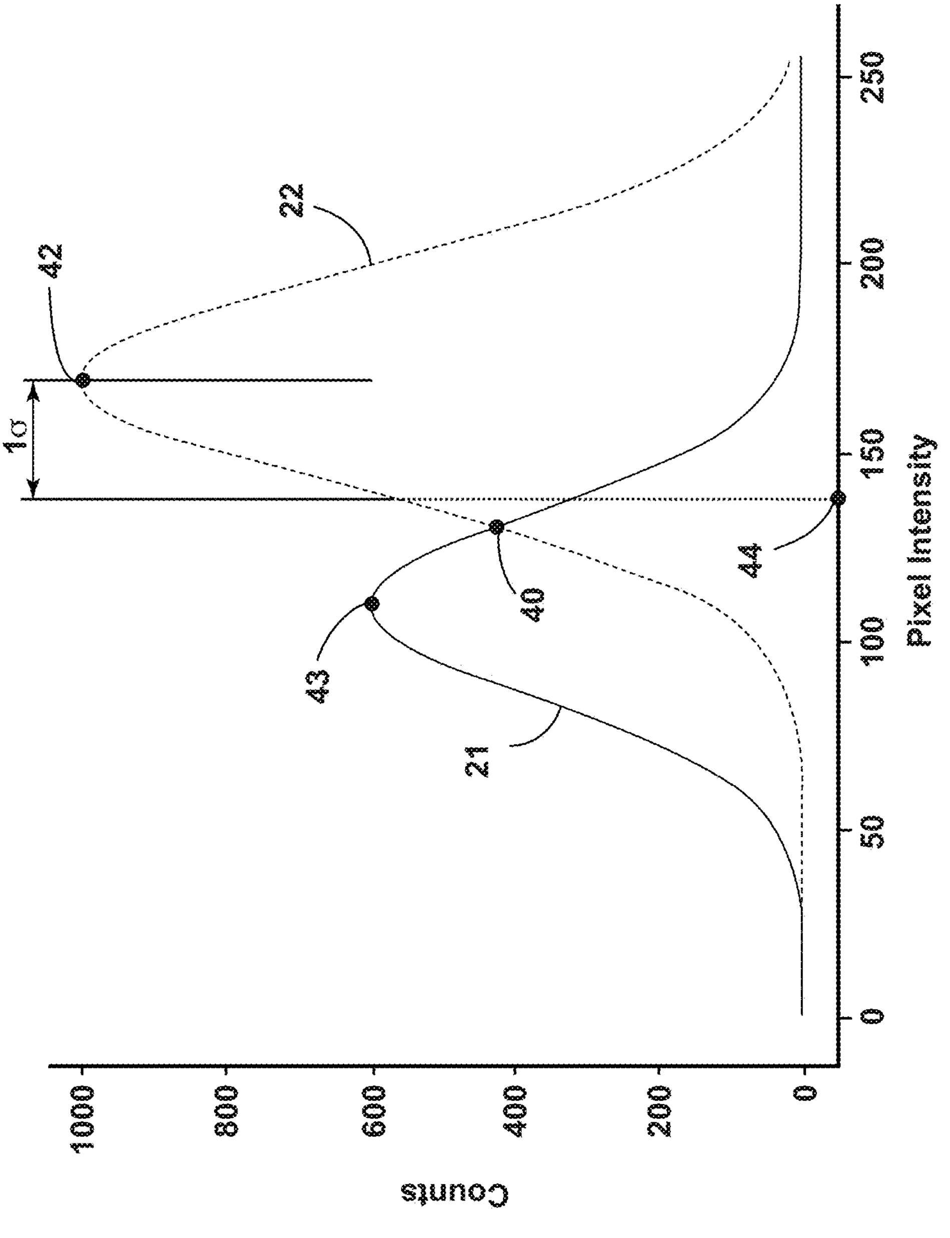
FIG. 11 is a graph showing a disorder calculation corresponding to FIG. 10.

With reference to FIGS. 10 and 11, a disorder analysis process 5 starts at 25, and includes forming a Fourier spectrum at step 26. The Fourier spectrum is formed by taking a Fourier transform of a human-drawn image (e.g., image 15 of FIG. 4). It will be understood that the image 15 may be in the form of digital data. At step 27, an idealized modulation transfer function (MTF) is applied to the Fourier spectrum 26A that is output from step 26. This forms an MTF-modified Fourier transform 27A that is utilized in step 28. At step 28, an inverse Fourier transform of the MTF-modified Fourier transform 27A is utilized to form a modified image 28A (e.g., modified image 16 of FIG. 5). At step 29, the modified image is converted to grayscale. The process 5 may optionally include selecting a region of interest at step 30. For example, if a human-drawn image includes numerous features or objects, a particular feature or object may be selected from the image for evaluation. It will be understood that the region of interest may be selected from the original human-drawn image prior to step 26.

As discussed in more detail below in connection with FIG. 11, at step 31 a pixel intensity histogram is calculated utilizing the modified image determined at step 28. At step 32, an algorithm (e.g., a stochastic funnel algorithm) is used to calculate initial fitting parameters for two-skewed Gaussian curves 21 and 22 (FIG. 11), and the overall fit (e.g., line 23, FIG. 6) may also be determined. At step 33, the least squares method may be used to calculate the Gaussian curve parameters using the initial fitting parameters determined at step 32.

At step 34, a root-finding algorithm (e.g., Newton's method) is used to find the intersection 40 (FIG. 11) between the two Gaussian curves 21 and 22 resulting from the curve fit. At step 35, a number of standard deviations that the intersection 40 is away from the curve (i.e., one of curves 21 and 22) having the highest center point (e.g., point 42; FIG. 11) is calculated. A threshold value 44 is set to the value of the highest center point value minus the floor of that number of standard deviations. As discussed below, the threshold value may be used to determine which pixels are "bright" (white), and which pixels are "dark" (black).

At step 36, a binary threshold is performed on the image using the threshold value calculated at step 35. Pixels having an intensity that is greater than the threshold value are given (assigned) a white (high) intensity value, and pixels having an intensity that is less than the threshold value are given (assigned) a black (low) intensity value. In general, the result of the binary threshold is a black (dark) and white (bright) image (not shown) having white (ordered) regions and black (disordered) regions. At step 37, a numerical value, which may comprise the order parameter ($S^2$), of the image is calculated by counting the bright (white) pixels in the thresholded image and dividing this number by the total number of pixels contained within the image. The total number of pixels is equal to the sum of the number of dark (black) pixels and the number of bright (white) pixels. Because the sizes (areas) of each of the pixels are the same, the numerical value of S2 is the ratio of the area of the bright regions to the total area. The method 5 then ends as shown at 38. It will be understood that the numerical value of $S^2$ is transferred to a trained AI model 6 as shown by arrow 5A of FIG. 1. It will also be understood that the numerical value may comprise the ratio of the area of the dark regions to the total area (i.e., $1-S^2$).

It will be understood that forming a modified image is not limited to specific examples of steps 26-28 of FIG. 10. Forming a modified image may involve utilizing a computer to perform an operation (e.g. mathematical) on a human (hand) drawn image that generally replicates a physical image formation process.

Also, although an idealized MTF is preferably utilized at step 27 of FIG. 10, virtually any MTF that models a physical lens could also be used. Also, a corresponding operation for the MTF could be done directly to the human-drawn image. This operation could provide substantially the same results as applying the MTF to the Fourier transform, but without the need to take an FFT.

In general, forming a modified image (e.g., steps 26-28 of FIG. 10) prior to performing the S2 calculation of the steps 29-37 results in a greater range of $S^2$ values, as shown in Table 1:

TABLE 1

| Image | $S^2$ (using FFT Method) | $S^2$ (using the histogram method directly on the hand-drawn image) |
|---|---|---|
| Carrot 1 | 0.694 | 0.961 |
| Carrot 2 | 0.554 | 0.963 |
| Carrot 3 | 0.336 | 0.958 |
| Carrot 4 | 0.309 | 0.955 |
| Pizza 1 | 0.747 | 0.958 |
| Pizza 2 | 0.363 | 0.962 |
| Pizza 3 | 0.343 | 0.960 |
| Hey 1 | 0.590 | 0.929 |
| Hey 2 | 0.423 | 0.940 |
| Hey 3 | 0.283 | 0.921 |
| Hey 4 | 0.269 | 0.904 |

In the examples of Table 1, the S2 value for all images is greater than 0.9 if the human-drawn image is not modified prior to steps 29-37. However, modifying the human-drawn images results in S2 values having a much larger numerical range (e.g., 0.269-0.590 for the four "Hey" images 20A-20D). This greater numerical range of disorder values may provide more accurate results when utilized as an input to the AI.

FIG. 11 shows the process for finding the threshold value 44 from the fitted curves 21 and 22. As discussed above in connection with FIG. 10, a disordered curve 21 and an ordered curve 22 may be fitted using, for example, skewed Gaussian curve parameters. The intersection 40 of the curves 21 and 22 may then be determined (e.g., using Newton's method), and a threshold value 44 may then be determined. In the example of FIG. 11, the disordered curve 21 has a center point or peak 43, and the ordered curve 22 has a center point or peak 42. In the example of FIG. 11, the threshold value 44 is approximately 140. However, the threshold value may vary for different images. For example, with reference to FIG. 6, the threshold value 42 may be about 230 for the image 15 of FIG. 4. It will be understood that the present disclosure is not limited to a specific technique or approach for determining the threshold value.

A process according to the present disclosure may be implemented utilizing virtually any suitable software and device. For example, the process may be coded in Flutter®, which allows various operating systems such as iOS®, Android®, Linux®, Mac®, and Windows® devices to be used with a single code base. However, it will be understood that this in no way limits or prevents the process from being compiled and deployed on other platforms.

A process according to the present disclosure may be implemented utilizing software (an app) that provides a convenient interface to permit users to add new symbols, retrain old symbols, or to enable application-specific administrative tasks to be performed. An aspect of the present disclosure may comprise symbol training workflow. This may be utilized because an AI model (e.g., machine learning model) may need a set of (for example) 5 to 10 examples to train with to enable recognition for each new symbol. At least two approaches may be utilized to add new symbols into the recognition system of the device 1, including: 1) batch processing, and 2) a single symbol at a time. Batch processing allows users to upload a dataset of images with examples of each image in a folder with the desired word to be associated with the image. Single image training may comprise an engagement system or feature that prompts a user to enter the symbol in a variety of ways to generate a dataset of at least, for example, 10 examples to be used to train the AI model to recognize the symbol (image) as the desired word. In addition to these two features of the software (app), there may also be an administration center for viewing the database of symbols that can be recognized along with their associated words, as well as the ability to edit words, retrain symbols, and track usage statistics.

The AI model may comprise a base machine learning model for symbol recognition that is deployed with the software (app), and is then retrained on the device to recognize symbols created by one or more users. The machine-learning model may be based, for example, on an Inception-v4 architecture, which is a known architecture for image recognition tasks. To improve symbol recognition, the base architecture may be modified by adding as additional input the degree of disorder of the symbol (e.g., the numerical value of S2), which may be calculated using the process described in more detail above.

The AI model may be trained on a known dataset (e.g., Google Quick, Draw!®) containing a very large number of labeled drawings. The degree of disorder of each drawing in the dataset may be calculated using the process described above. According to one aspect or example, the AI model 6 may be trained using a KubeFlow® workflow using a Kubernetes® cluster to perform model architecture and hyperparameter tuning and optimization. This may permit training machine learning models to develop a model that achieves a predefined accuracy rate (e.g., 95%) on symbol identification (recognition) on the evaluation portion of the dataset. In the event a dataset does not include a sufficiently wide range of different images and corresponding disorder values for a given label, disorder can be simulated by applying distortion filters to images to create alternative images (e.g., images 15B-15D, FIG. 7). It is also possible to generate a dataset of drawings with a wide range of disorder values for a sub-selection of labels from the Quick, Draw!® dataset.

The machine learning model may be integrated into an app. For example, the trained model may be converted into TensorFlow® lite format (for Android® devices) and Core-ML® format (for Apple® devices). Also, the automated disorder analysis procedure 5 (FIG. 1) may be coded in Flutter® as noted above so it can provide the disorder input 5A (FIG. 1) into the machine learning (AI) model 6.

A program and process according to the present disclosure may incorporate specific features to enhance the functionality of the app. For example, one feature may be a Hidden Markov Model language model to provide word and phrase prediction. This feature may improve the word-per-minute that is achievable using the app by providing suggestions for the next word or phrase based on the words already present in a phrase or sentence, thereby reducing or eliminating the need to draw the symbol for the next word. The prediction may pull from the words for which the user has defined symbols, and the predictions may continually update based on the usage of words and phrases of a user. Additional optimizations may include using GPS location (if available) to refine the word selection choices (e.g., common menu items at an identified restaurant, or health-related terms at a medical service provider office).

Another aspect (optional) of the present disclosure is integrated progress tracking. This functionality tracks two features when a symbol is drawn. First, it tracks the confidence that the machine or AI model has that it is the given symbol, and the degree of disorder of the symbol, and does so for each defined symbol/text pair. Second, this information may be viewed per defined symbol within the administration portion of an app, allowing an individual (or a therapist) to track progression over time.

As noted above, device 1 (see, e.g., FIG. 1) may comprise virtually any suitable device. An example is a Linux-based Raspberry Pi. This may comprise a single board Linux computer of a known type that is extensively used in custom-built hardware projects. The device 1 may include a touch screen, buttons, switches, and other hardware input devices, which may be utilized to speed up user input and communication.

The present disclosure may utilize a Jetson Nano (a low-cost single-board Linux computer) which may include dedicated hardware for AI acceleration as well as a connection for PCIe-based AI accelerators. A compact device utilizing the Jetson Nano board form factor with pin-edge connectors may also be utilized, along with printed circuit boards (PCBs), to attach the Jetson module to the other peripherals (e.g., touch screen, battery, GPIO input devices, and AI accelerators) as well as a housing to enclose the device.

It will be understood that any described processes or steps within described processes may be combined with other disclosed processes or steps to form structures within the scope of the present device. The sequence of the process or method steps described herein are not limited to the sequences described herein unless a different sequence is not possible. The example structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

The above description is considered that of the illustrated embodiments only. Modifications of the processes will occur to those skilled in the art and to those who make or use the processes. Therefore, it is understood that the embodiments shown in the drawings and described above are merely for illustrative purposes and not intended to limit the scope of the disclosure, which is defined by the following claims as interpreted according to the principles of patent law, including the Doctrine of Equivalents.

The invention claimed is:

1. A computer-implemented method of recognizing the content of a human-drawn image, the method comprising:

utilizing a computer to form a modified image from a human-drawn image by replicating a physical image formation process;

utilizing a computer to extract a numerical value corresponding to an order parameter squared ($S^2$) from the modified image, wherein the modified image includes light regions and dark regions, and wherein $S^2$ comprises a numerical value quantifying a degree of order present in the modified image, and wherein the extracted numerical value comprises a ratio of an area of the light regions to a total area that is equal to the sum of: 1) an area of the light regions, and 2) of an area of the dark regions;

causing an artificial intelligence (AI) program to characterize the human-drawn image utilizing: 1) the human-drawn image, and 2) the numerical value of the order parameter extracted from the modified image formed from the human-drawn image; and:

causing the computer to output at least one of an image and text that identifies the human-drawn image.

2. The method of claim 1, further including:

training the AI program by causing the AI program to characterize human-drawn images for a plurality of non-identical human-drawn images using 1) each of the plurality of non-identical human-drawn images, and 2) the numerical value of the order parameter extracted from the modified image formed from each of the plurality of non-identical human-drawn images.

3. The method of claim 2, wherein:

the plurality of non-identical human-drawn images are formed by a human utilizing an input device that allows a user to manually form the human-drawn image data.

4. The method of claim 1, wherein:

the computer comprises a portable device having a touch screen;

the human-drawn image data includes at least one image drawn by a human using the touch screen.

5. The method of claim 4, wherein:

the portable device is selected from the group consisting of smart phones and tablet computers.

6. The method of claim 1, wherein:

the human-drawn image comprises a symbolic drawing of an object;

the AI program characterizes the symbolic drawing by outputting a word describing the object.

7. The method of claim 1, wherein:

the human-drawn image comprises text;

the AI program characterizes the symbolic drawing by outputting a word describing the text.

8. The method of claim 1, wherein:

causing the AI program to characterize the human-drawn image includes supplying the AI with 1) the human-drawn image, and 2) the numerical value of the order parameter extracted from the modified image formed from the human-drawn image.

9. The method of claim 1, wherein:

the computer comprises a draw-to-speech device;

the human-drawn image represents at least one of numbers, letters, words, pictures, or concepts; and including:

causing the draw-to-speech device to generate an audio signal comprising a word corresponding the numbers, letters, words, pictures, or concepts of the human-drawn image.

10. The method of claim 1, wherein utilizing a computer to form a modified image from a human-drawn image includes:

utilizing a computer to form a Fourier spectrum by taking a Fourier transform of the human-drawn image that is in the form of digital image data;

utilizing a computer to form an MTF-modified Fourier transform by applying an idealized modulation transfer function (MTF) to the Fourier spectrum, wherein the MTF is constant across all frequencies;

utilizing a computer to form a modified image by taking an inverse Fourier transform of the MTF-modified Fourier transform.

11. A data processing system for recognizing the content of a human-drawn image comprising means for forming a modified image from a human-drawn image by replicating a physical image formation process;

extracting a numerical value corresponding to an order parameter squared $S^2$ from the modified image, wherein the modified image includes light regions and dark regions, and wherein $S^2$ comprises a numerical value quantifying a degree of order present in the modified image, and wherein the extracted numerical value comprises a ratio of an area of the light regions to a total area that is equal to the sum of: 1) an area of the light regions, and 2) of an area of the dark regions;

using an artificial intelligence (AI) program to characterize the human-drawn image utilizing: 1) the human-drawn image, and 2) the numerical value of the order parameter extracted from the modified image formed from the human-drawn image; and:

outputting at least one of an image and text that identifies the human-drawn image.

12. The system of claim 11 wherein the system comprises a draw-to-speech device.

13. The system of claim 11, wherein said human-drawn image represents at least one of numbers, letters, words, pictures, or concepts; and the draw-to-speech device is capable of generating an audio signal comprising a word corresponding to the numbers, letters, words, pictures, or concepts of the human-drawn image.

14. The system of claim 11, wherein the system comprises a portable device having a touch screen; and the human-drawn image data includes at least one image drawn by a human using the touch screen.

15. The system of claim 14, wherein:

the portable device is selected from the group consisting of smart phones and tablet computers.

16. The system of claim 11, wherein forming a modified image from a human-drawn image includes:

utilizing a computer to form a Fourier spectrum by taking a Fourier transform of the human-drawn image that is in the form of digital image data;

utilizing a computer to form an MTF-modified Fourier transform by applying an idealized modulation transfer function (MTF) to the Fourier spectrum, wherein the MTF is constant across all frequencies;

utilizing a computer to form a modified image by taking an inverse Fourier transform of the MTF-modified Fourier transform.

* * * * *